United States Patent
Jaynes et al.

(10) Patent No.: US 9,437,160 B2
(45) Date of Patent: *Sep. 6, 2016

(54) SYSTEM AND METHOD FOR AUTOMATIC COLOR MATCHING IN A MULTI DISPLAY SYSTEM USING SENSOR FEEDBACK CONTROL

(71) Applicant: Mersive Technologies, Inc., Denver, CO (US)

(72) Inventors: Christopher O. Jaynes, Denver, CO (US); Thomson Comer, Denver, CO (US); Stephen B. Webb, Denver, CO (US); Michael Tolliver, Denver, CO (US)

(73) Assignee: Mersive Technologies, Inc., Denver, CO (US)

( * ) Notice: Subject to any disclaimer, the term of this patent is extended or adjusted under 35 U.S.C. 154(b) by 210 days.

This patent is subject to a terminal disclaimer.

(21) Appl. No.: 14/100,986

(22) Filed: Dec. 9, 2013

(65) Prior Publication Data

US 2014/0104304 A1 Apr. 17, 2014

Related U.S. Application Data

(63) Continuation-in-part of application No. 13/184,282, filed on Jul. 15, 2011, now Pat. No. 8,606,004.

(60) Provisional application No. 61/364,673, filed on Jul. 15, 2010.

(51) Int. Cl.
*G06K 9/00* (2006.01)
*G09G 5/02* (2006.01)
(Continued)

(52) U.S. Cl.
CPC .............. *G09G 5/02* (2013.01); *G06F 3/1446* (2013.01); *G09G 5/12* (2013.01); *H04N 1/6055* (2013.01);
(Continued)

(58) Field of Classification Search
CPC ........ G06F 3/1446; G09G 5/02; G09G 5/12; G09G 2320/0233; G09G 2320/0285; G09G 2320/0666; G09G 2320/0693; G09G 3/006; H04N 1/6055; H04N 9/3147; H04N 9/3182; H04N 9/3194
USPC ................ 382/162, 167; 348/179, 178, 656; 345/904, 150, 132, 147
See application file for complete search history.

(56) References Cited

U.S. PATENT DOCUMENTS 5,212,545 A * 5/1993 Kageyama ............... H04N 9/72 348/655
5,212,546 A * 5/1993 Arazi .................... H04N 1/6011 101/211

(Continued)

FOREIGN PATENT DOCUMENTS

JP 2006080948 3/2006

OTHER PUBLICATIONS

U.S. Appl. No. 13/184,282 select file history dated Oct. 26, 2012 through Aug. 5, 2013, 40 pages.

*Primary Examiner* — Mekonen Bekele
(74) *Attorney, Agent, or Firm* — Lathrop & Gage LLP

(57) ABSTRACT

A system for automatic color matching of multiple displays in a multi-display system. A sensor observes the output energy of each of the displays in a multi-display system and measures the difference in the color responses for a given input color. This difference is used to derive a modification function that is applied to each display. The displays are modified accordingly, and then the color is displayed again. This process is repeated until the measured values from each of the displays are within a minimum measurement error tolerance, so that the differences in displayed colors observed among the displays are minimized.

9 Claims, 2 Drawing Sheets

(51) Int. Cl.
*G09G 5/12* (2006.01)
*H04N 1/60* (2006.01)
*H04N 9/31* (2006.01)
*G06F 3/14* (2006.01)
*G09G 3/00* (2006.01)

(52) U.S. Cl.
CPC .......... *H04N 9/3147* (2013.01); *H04N 9/3182* (2013.01); *H04N 9/3194* (2013.01); *G09G 3/006* (2013.01); *G09G 2320/0233* (2013.01); *G09G 2320/0285* (2013.01); *G09G 2320/0666* (2013.01); *G09G 2320/0693* (2013.01)

(56) References Cited

U.S. PATENT DOCUMENTS

| | | | |
|---|---|---|---|
| 5,343,311 A * | 8/1994 | Morag | G06T 11/001 358/500 |
| 5,638,117 A | 6/1997 | Engeldrum et al. | |
| 5,874,988 A | 2/1999 | Gu | |
| 6,043,909 A * | 3/2000 | Holub | G06F 3/1267 348/E17.004 |
| 7,009,733 B2 * | 3/2006 | Gruzdev | H04N 1/62 358/1.9 |
| 8,441,682 B2 * | 5/2013 | Chung | H04N 1/6055 358/1.9 |
| 8,606,004 B2 * | 12/2013 | Jaynes | H04N 1/6055 358/504 |
| 2003/0002095 A1 | 1/2003 | Gruzdev et al. | |
| 2006/0181719 A1 * | 8/2006 | Aoki | H04N 1/6052 358/1.9 |
| 2011/0298837 A1 * | 12/2011 | Holub | G06F 3/14 345/690 |
| 2012/0014593 A1 * | 1/2012 | Jaynes | H04N 1/6055 382/165 |

\* cited by examiner

SYSTEM AND METHOD FOR AUTOMATIC COLOR MATCHING IN A MULTI DISPLAY SYSTEM USING SENSOR FEEDBACK CONTROL

RELATED APPLICATIONS

This application is a continuation-in-part of U.S. patent application Ser. No. 13/184,282, filed Jul. 15, 2011, which claims priority to U.S. Provisional Patent Application Ser. No. 61/364,673, filed Jul. 15, 2010. Both of the aforementioned applications are incorporated herein by reference. U.S. patent application Ser. No. 61/264,988, "Camera-Based Color Correction of Displays Using Linear Subspace Projections" filed Nov. 30, 2009, is also herewith incorporated by reference.

BACKGROUND

Multi-display systems are typically composed of a set of disparate display devices, e.g., projectors, that are used in concert with one another to render a single image. The approach has advantages such as very-high resolution, large-format, and flexibility. However, differences in the underlying displays detract from the composite image and should be addressed. The present system and method addresses the color differences that exist due to engineering/tolerance differences in the underlying display devices, degradation of the display image over time, and even differences in the underlying display technologies (e.g., a display composed of LCD and DLP projection units).

Traditional approaches to color alignment range from by-hand tuning of the projectors and ICC profiling to semi-automatic methods that directly communicate with the projector. Clearly, methods that require human interaction suffer from the additional time and cost of tuning the projectors. Typically methods require an expert user and may mean that displays go without by-hand color alignment for long periods of time. In addition, not all projectors support the type of controllability that a by-hand solution requires.

In addition, current color alignment solutions use projector-specific settings to modify the color transform. This limits these approaches to particular projectors and restricts the corrective transform to the available transforms in the projector.

Solution

The present method provides automatic color correction for multi-display systems. In particular, when combining multiple displays into a single coherent display (either by overlapping multiple projectors or by tiling display panels into a large array), it becomes important that the individual displays exhibit similar color characteristics. For example, when one display depicts a color triplet (R G B) whose values are [200 10 10], other displays displaying the same RGB triplet should show the same color so that a viewer sees a single uniform color across the entire display array. Without a method to calibrate and correct for color differences, different display devices will generate different color responses for a given input RGB value. The present system detects and corrects these color response differences to enable a uniform (in color and intensity) display across multiple display devices.

The present system uses a software-based solution that first models the color response of each projector with a camera and then applies a corrective transform in the rendering pipeline. This ensures maximum flexibility in applying the corrective transform and supports a more accurate color alignment for any set of projectors. If needed, the system is also able to translate this color transform into hardware instructions for any device that can support color correction. For example, color correction can be supported in hardware warp/blend devices as well as directly on the projector.

A camera or other sensor is used to observe each display for a set of color input values. Once measured, the color response of the individual displays can then be compared to other displays in the system. The system then determines an appropriate modification to apply to each display device that will drive the difference towards a color value that matches.

SUMMARY

A sensor observes the output energy of each of the displays in a multi-display system and measures the difference in the color responses for a given input color. This difference is used to derive a modification function that is applied to each display. The displays are modified accordingly, and then the color is displayed again. This process is repeated until the measured values from each of the displays are within a minimum measurement error tolerance, so that the differences in displayed colors observed among the displays are minimized.

DETAILED DESCRIPTION

The present color alignment system operates via a closed-loop control and optimization process. The system iteratively controls the output of multiple display devices, modifies the behavior of one or more of the display devices based on measurements, and then re-measures the display output. This process continues until the difference between the displays is minimized.

Figure 1:
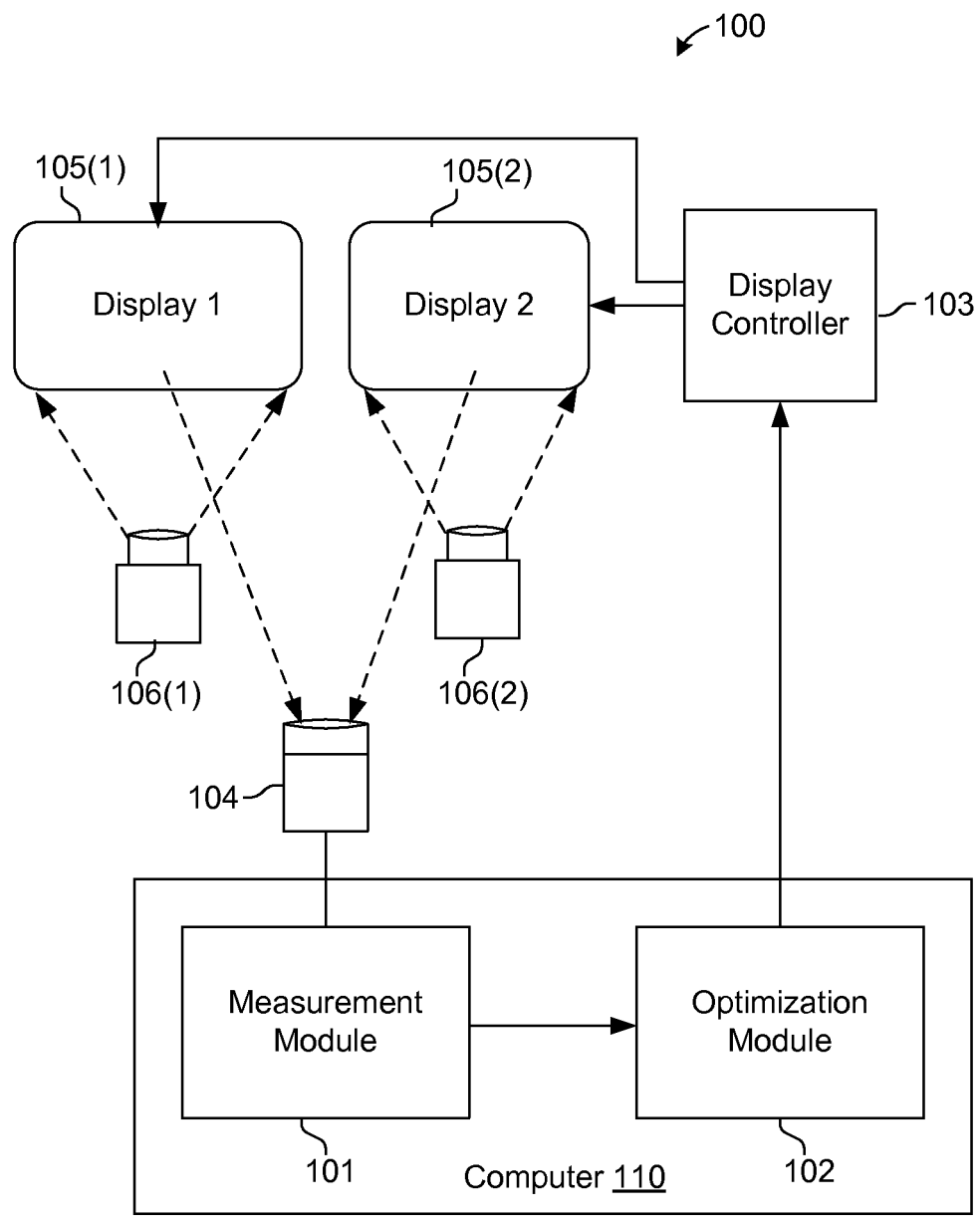
FIG. 1 is a diagram illustrating exemplary components of the present system.

FIG. 1 is a block diagram of exemplary components of the present system 100. As shown in FIG. 1, in an exemplary embodiment, a closed-loop search process, controlled by a PC or other computer 110, drives two displays 105(1) and 105(2) towards a similar color response by controlling the color response of corresponding projectors 106(1) and 106(2) using a sensor 104, a measurement module 101, an optimization module 102, and a display controller 103. It should be noted that the present system is operable with more than two displays, and that the displays may overlap and/or be positioned relative to each other in any desired configuration.

Initially, the color response of each display is measured for either single or multiple color values. An optimization module then computes an error function that relates the observed color differences to a particular error metric. This error metric, possibly combined with earlier errors and observations, determines how the projectors need to be modified to reduce the observed error. This modification is passed to the display controller and the process is repeated. The process terminates when alignment has been reached.

The Measurement Process

Figure 2:
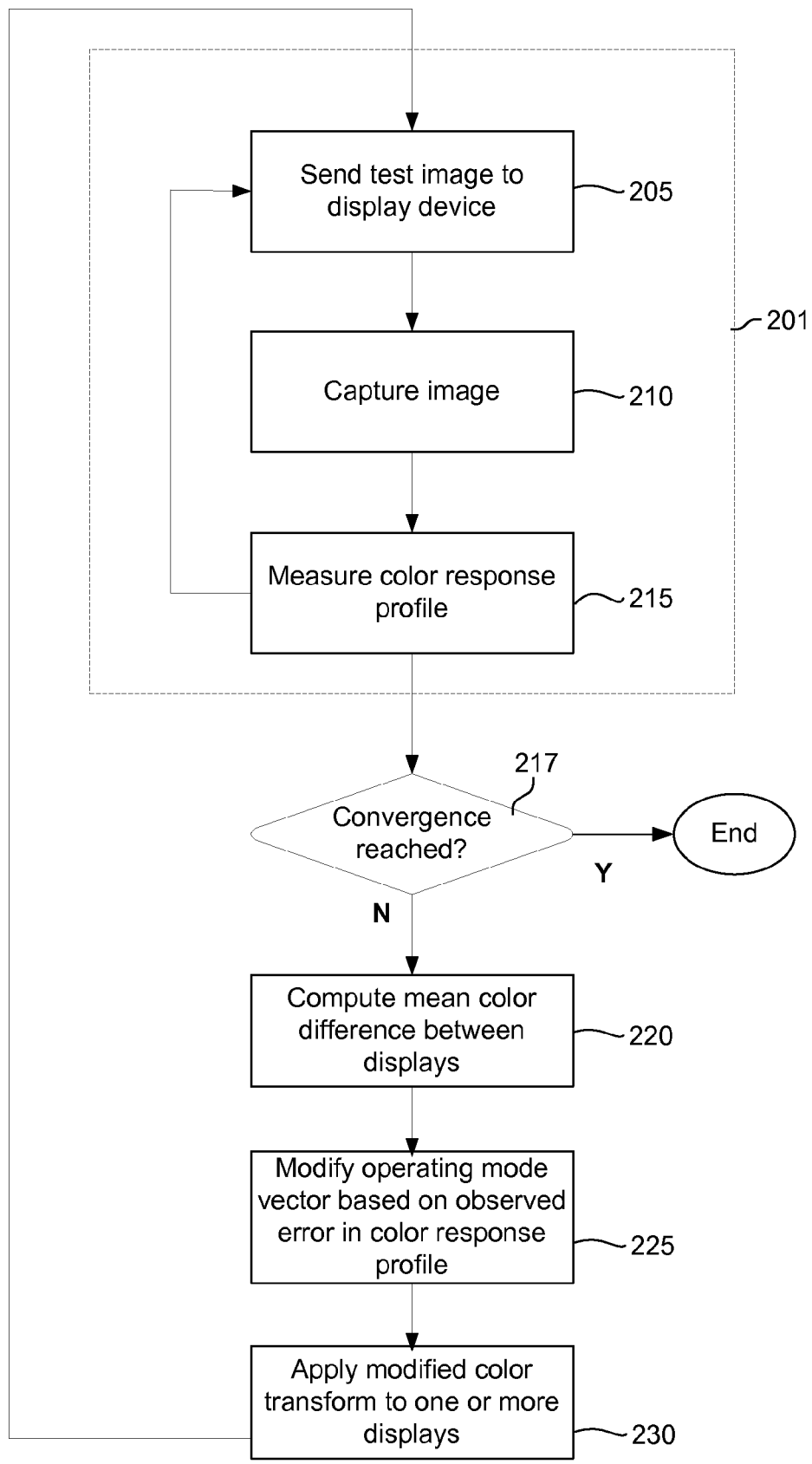
FIG. 2 is a flowchart showing an exemplary set of steps performed by the present system in providing automatic color alignment across multiple displays.

FIG. 2 is a flowchart showing an exemplary set of steps performed by the present system in providing automatic color alignment across multiple displays. As shown in FIG. 2, at step 205, each projector 106 in the present system is driven by display controller 103 to generate a test image that contains a range of color values. Each of these test images is captured by camera 104, at step 210, to derive a color response profile for the corresponding projector 106/display 105, at step 215.

In an alternative embodiment, the test image is the image that the display would have displayed during its normal use. That is, the test image is simply whatever frame the computer would have displayed at a particular iteration, i.e., the current contents of the frame buffer. In practice, if a user is displaying a document, or email, etc., the test image comprises the pixel color values and positions of the current display frame. The color response is then iteratively measured in the camera.

It should be noted that the color response profile being measured at any given moment is modified by the current control function embedded in the display controller 103. The color response profiles can be gathered via a variety of sensors including digital cameras and radiometric sensing devices. The present method may, alternatively, use any sensing device capable of measuring the color response of a display device. The observed values can be modified to improve their accuracy through image processing or statistical analysis operations such as computing a mean measurement repeatedly or computing a mean color response over a range of pixels in a CCD.

The use of a specialized radiometer to generate an ICC (International Color Consortium) profile allows a user to characterize the color response of the projection device in a standardized way. These profiles can be used by graphics drivers, applications that support them (e.g., design software for users that are sensitive to the color response of a display, such as Adobe Pagemaker), and the profiles are sometimes used to inform the by-hand tuning process. It should be noted that the present color alignment system supports the use of a radiometer and can directly load ICC profiles. This industry standard support is valuable to those who would like to use the same measurement process they have been using in the past, but want the correction quality provided by the present color alignment system.

Computing a Corrective Step

Once the color response profile of each display has been captured, the current color behavior of each of the displays is known. The color difference between the multiple displays is then computed at step 220. In an exemplary embodiment, the mean color intensity difference as measured in RGB space is used as a difference measure. Other distance measures that may be used include the current maximum difference of any measured color or the difference in volume of the complete color gamuts of the display. This color difference, e, is associated with the current operating mode of each of the projectors.

In an exemplary embodiment, the system operating mode is represented as a vector of operating modes that represents the current color transfer function of each of the k displays in the system, $O=[o1\ o2\ \ldots\ oi\ \ldots\ ok]$. This vector describes, for a given input color value [R G B] into each of the projectors what the actual input value to the system should be. For example, consider a projector that was deemed by the difference metric to be displaying more red than the other displays in the system. Given an input value of [100 10 10], a corresponding color transfer function that may improve the color alignment of the display may map that color to a value with less red, for example, oi (100, 10, 10)=[90 10 10].

The goal of the computing a corrective step is to modify the operating mode vector O for an observed error e so that the expected error at the next measurement will be reduced. This entails modifying the underlying color transfer functions in an intelligent manner that will yield a more similar observed color across all displays. This can be accomplished through a variety of methods include gradient descent techniques or more sophisticated iterative search methods including Levenberg-Marquardt optimization or covariance analysis.

Operating vector modification can also be performed by another well-known method for random sample optimization called "Random Sample Consensus" (RANSAC). In this embodiment, the operating mode vector is modified by measuring the one or more randomly sampled corresponding output values as observed by a sensor to generate a set of output and observed value pairs.

In an exemplary embodiment, the present system employs a modified gradient descent optimization approach. The system iteratively modifies display input (RGB) values, and measures the corresponding output value as observed by a sensor. The observed value is compared to a target value, and a correction factor is computed. In traditional gradient descent techniques the correction value is based on derivative information computed from previous iterations (numerical derivative). External (previously measured) knowledge about the global projector response function may be used to provide derivative information, which is in turn used to compute the next input value. Using this external data is helpful to avoid local gradient instability due to measurement error ('noise') that is inherent to the sensor feedback step.

In an alternative embodiment, the 'color' function is simply the intensity of the RGB color channels as measured in the camera. In this embodiment, the present method employs color correction using the per-pixel intensity on each color channel, where the operating mode vector maps a pixel location to an R,G,B attenuation value for each location in the display.

In another alternative embodiment, the present method employs per pixel color correction based on the location of each pixel, where the operating mode vector maps a pixel location to a modified RGB value.

At step 225, either the entire vector O is updated or some subset of color transfer functions are modified. In an exemplary embodiment, only a single transfer function is updated (i.e., a single display's color space is modified) until that display converges. In any case, this stage produces a new value for vector O that describes a new color response behavior for the entire display system.

Applying the Correction

Once a set of color transfer functions have been derived for the projector set, optimization module 102 informs display controller 103 of the modified color transfer functions so that each of the displays can now take into account its own color transfer function when colors are displayed, at step 230. The color transfer function can be implemented in hardware as a transform that is applied directly on the projector, in video processing hardware that modifies the video signal, or in software, as the colors used to drive the projector are being derived.

Once stored, these new functions modify the behavior of the displayed image so that subsequent measurements can observe the changes effected by the new transfer function. This process is iteratively performed until the system converges.

Convergence

The process of measuring a display (block 201), deriving an error metric, determining how to modify the color transfer functions of the display, and then applying that modification continues until the system converges at step 217. At convergence, either the error metric is within a predetermined tolerable level or some other convergence property has been reached. For example, a system is considered to have converged if the measured error is within the error tolerance for the sensing device. If the error has not improved over some number of iterations, or the number of iterations is simply too large, the process is terminated.

Once converged, the color transfer functions for the last iteration are now the set of functions that are applied to each of the displays in order to bring them into color alignment.

The above description of certain embodiments of the invention is not intended to be exhaustive or to limit the invention to the precise forms disclosed. The terms used in the claims should not be construed to limit the invention to the specific embodiments disclosed in the specification, rather, the scope of the invention is to be determined by the following claims.

What is claimed is:

1. A method for automatic color matching of a plurality of displays in a multi-display system comprising:
    (a) receiving a test image on each of the a plurality of displays, wherein the test image comprises pixel color values;
    (b) capturing the test image displayed on each of the displays;
    (c) measuring a color response profile for each of the displays;
    (d) modifying an operating mode vector, comprising the color transfer function for each of the displays, in response to measured error in the color response profile; wherein the color transfer function is modified for at least one of the displays;
    (e) applying the modified operating mode vector to the displays;
    wherein the operating mode vector is modified by a random sample optimization comprising:
    (f) modifying display input RGB values;
    (g) measuring one or more randomly sampled corresponding output values as observed by a sensor to generate a set of output and observed value pairs;
    (h) comparing the observed value to a target value;
    (i) computing a correction factor; and
    repeating steps (f) through (i) until the measured color response profile for each of the displays is within a predetermined error tolerance.

2. The method of claim 1, wherein the test image is the contents of the current framebuffer that would be displayed during normal operation of the display.

3. The method of claim 1, wherein the test image is the contents of the current framebuffer that would be displayed during normal operation of the display, wherein the test image comprises pixel color values.

4. A method for automatic color matching of a plurality of displays in a multi-display system comprising:
    (a) receiving a test image on each of the a plurality of displays, wherein the test image comprises pixel color values;
    (b) capturing the test image displayed on each of the displays;
    (c) measuring a color response profile for each of the displays;
    (d) modifying an operating mode vector, comprising the color transfer function for each of the displays, in response to measured error in the color response profile; wherein the color transfer function is modified for at least one of the displays;
    (e) applying the modified operating mode vector to the displays;
    wherein the operating mode vector is modified by a modified gradient descent optimization comprising:
    (f) modifying display input RGB values;
    (g) measuring the corresponding output value as observed by a sensor to generate an observed value;
    (h) comparing the observed value to a target value;
    (i) computing a correction factor; and
    repeating steps (f) through (i) until the measured color response profile for each of the displays is within a predetermined error tolerance.

5. The method of claim 4, wherein the test image is the contents of the current framebuffer that would be displayed during normal operation of the display, wherein the test image comprises pixel color values.

6. A method for automatic color matching of a plurality of displays in a multi-display system comprising:
    (a) sending a test image to each of the a plurality of displays;
    (b) capturing the test image displayed on each of the displays;
    (c) measuring a color response profile for each of the displays;
    (d) modifying an operating mode vector, comprising the color transfer function for each of the displays, in response to measured error in the color response profile;
    wherein the color transfer function is modified for at least one of the displays;
    (e) applying the modified operating mode vector to the displays;
    wherein the operating mode vector is modified by a modified gradient descent optimization comprising:
    (f) modifying display input RGB values;
    (g) measuring the corresponding output value as observed by a sensor to generate an observed value;
    (h) comparing the observed value to a target value;
    (i) computing a correction factor; and
    repeating steps (f) through (i) until the measured color response profile for each of the displays is within a predetermined error tolerance.

7. The method of claim 6, wherein the color matching is based on a per-pixel intensity on each color channel, wherein the operating mode vector maps a pixel location to an R,G,B attenuation value for each location in the display.

8. The method of claim 6, wherein the color matching is performed by using a per-pixel color correction based on the location of each pixel, wherein the operating mode vector maps a pixel location to a modified RGB value.

9. The method of claim 6, wherein the test image is the contents of the current framebuffer that would be displayed during normal operation of the display, wherein the test image comprises pixel color values.

* * * * *